United States Patent [19]

Coker et al.

[11] Patent Number: 5,416,806
[45] Date of Patent: May 16, 1995

[54] TIMING LOOP METHOD AND APPARATUS FOR PRML DATA DETECTION

[75] Inventors: Jonathan D. Coker; Richard L. Galbraith, both of Rochester, Minn.

[73] Assignee: International Business Machines Corporation, Armonk, N.Y.

[21] Appl. No.: 898,636

[22] Filed: Jun. 15, 1992

[51] Int. Cl.6 .......................... H04L 7/00; G11B 5/09
[52] U.S. Cl. ......................... 375/354; 375/290; 375/293; 360/32
[58] Field of Search ..................... 375/18, 20.98, 106, 375/118–120; 360/32, 51–52, 46

[56] References Cited

U.S. PATENT DOCUMENTS

| | | | |
|---|---|---|---|
| 4,494,242 | 1/1985 | Ehrenbard et al. | 375/118 |
| 4,617,679 | 10/1986 | Brooks | 375/119 |
| 4,646,173 | 2/1987 | Kammeyer et al. | 360/51 |
| 4,669,092 | 5/1987 | Sari et al. | 375/14 |
| 4,893,341 | 1/1990 | Gehring | 381/7 |
| 4,964,107 | 10/1990 | Galbraith et al. | 360/51 |
| 4,970,609 | 11/1990 | Cunningham et al. | 360/51 |
| 5,036,297 | 7/1991 | Nakamura | 331/17 |
| 5,138,632 | 8/1992 | Uchilda | 375/96 |
| 5,233,482 | 8/1993 | Galbraith et al. | 360/46 |

*Primary Examiner*—Stephen Chin
*Assistant Examiner*—Young Tse
*Attorney, Agent, or Firm*—Mason, Kolehmainen, Rathburn & Wyss

[57] ABSTRACT

Timing loop apparatus and method are provided for data detection in a partial-response maximum-likelihood (PRML) data channel. The PRML data channel includes an analog to digital converter (ADC) providing samples to a digital filter during a tracking mode and to a gain and timing control during an acquisition mode. Sample values from the ADC are received at peaks and zeros on sync field pattern. An error absolute value is calculated from the received ADC sample values and an error sign of the calculated error absolute valve calculated using a most significant bit of the current and a previous sample. Timing correction values are calculated responsive to the calculated error absolute value and applied to a clock gated register that latches and holds the generated timing correction values for a predefined number of clock cycles.

15 Claims, 5 Drawing Sheets

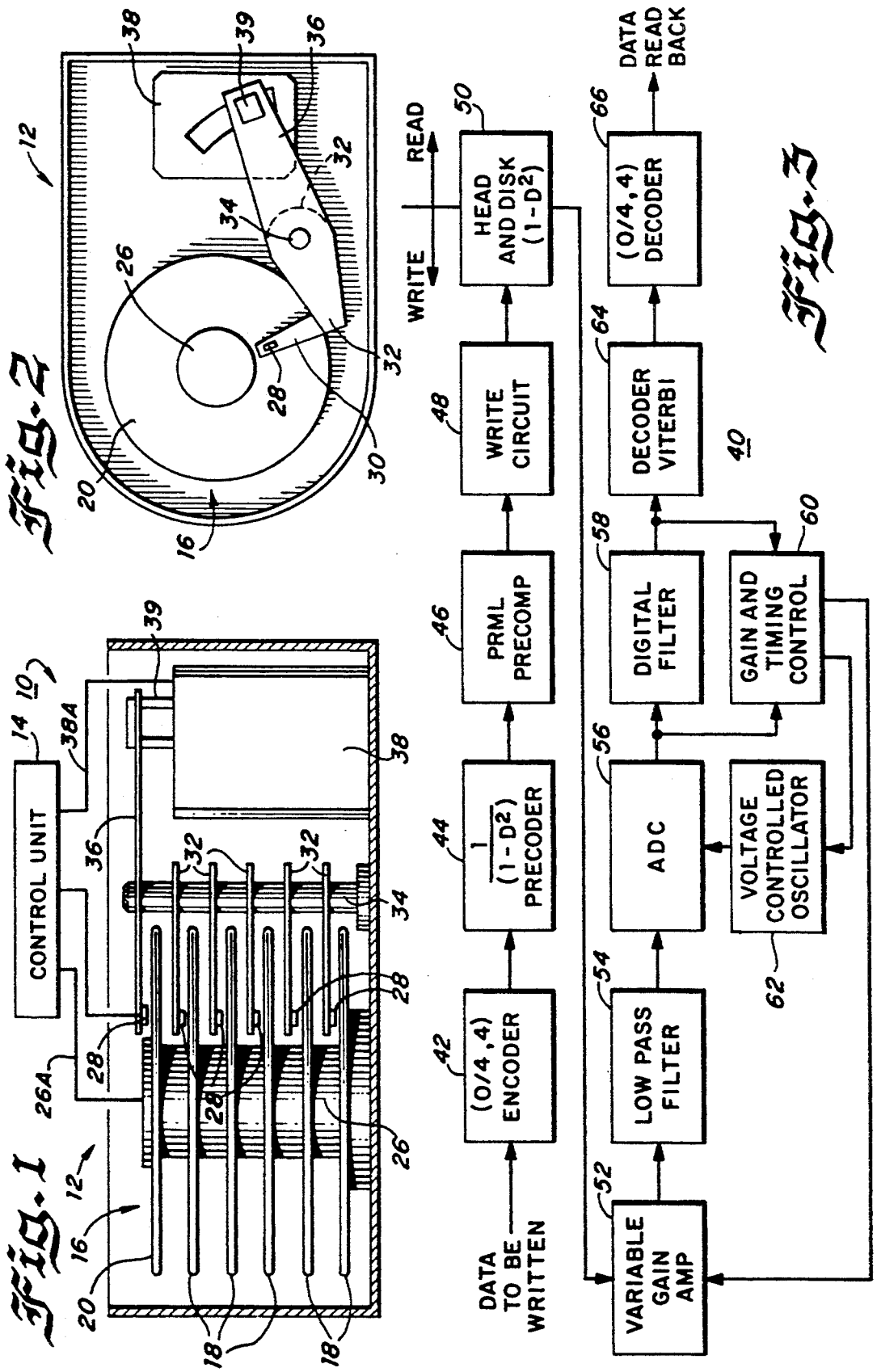

SYNC FIELD SAMPLING - nT RATE
PRIOR ART

SYNC FIELD SAMPLING - (n+0.5)T RATE

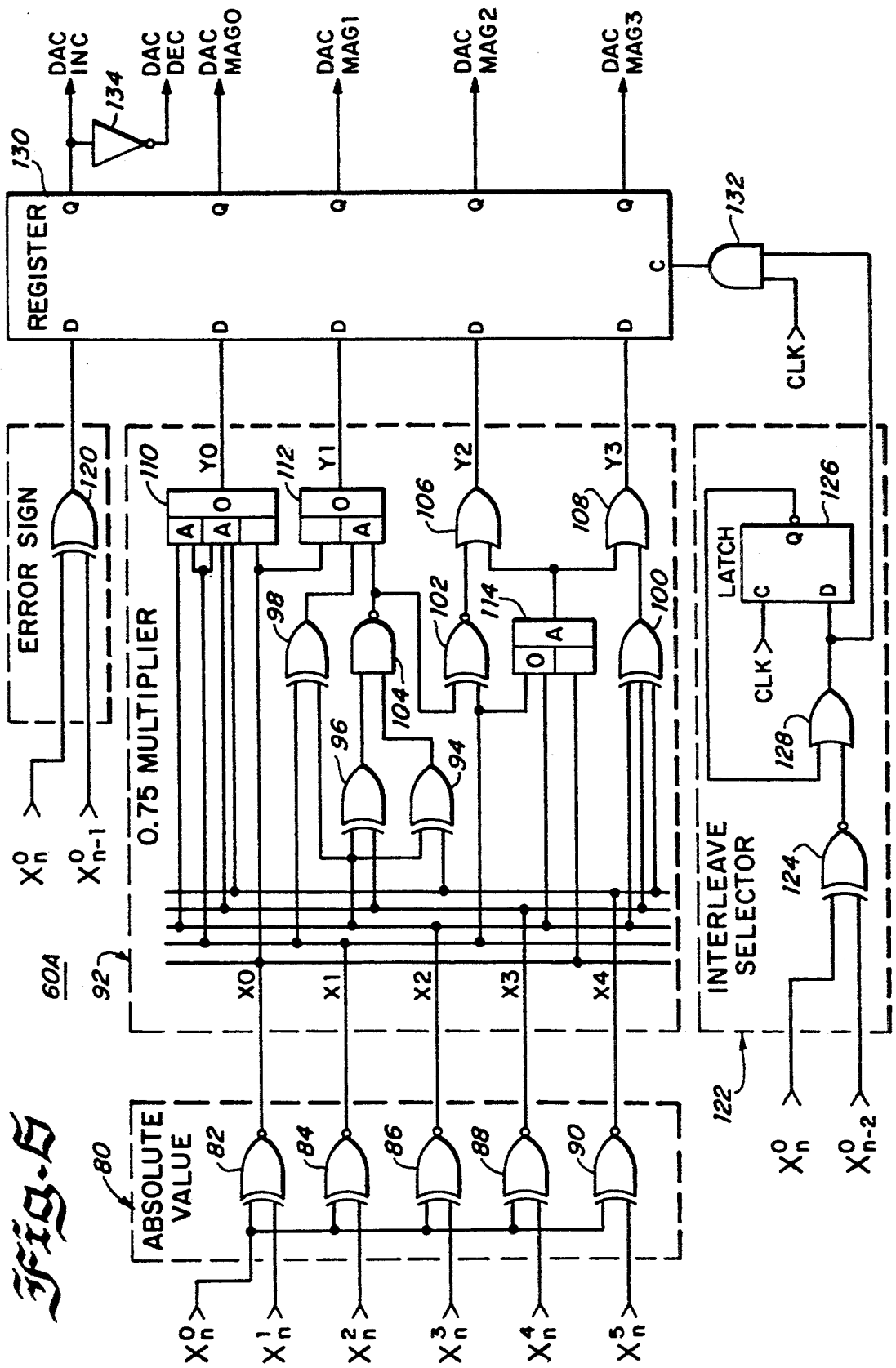

TIMING LOOP METHOD AND APPARATUS FOR PRML DATA DETECTION

BACKGROUND OF THE INVENTION

1. Field of the Invention.

The invention relates generally to a direct access storage device (DASD) of the type utilizing partial-response maximum-likelihood (PRML) detection, and more particularly to a method and apparatus for (n+0.5)T acquisition timing loop algorithm for PRML data detection, 2. Description of the Prior Art Computers often include auxiliary memory storage units having media on which data can be written and from which data can be read for later use, Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks.

Data channels in DASD units typically utilize a synchronous detection scheme. Both peak-detect and PRML are examples of synchronous data detection channels where synchronous refers to the frequency and phase locking of the channel to the readback signal in order to detect the data properly. In a DASD, typically a preamble pattern is written before the start of any data block. The preamble pattern often referred to as a sync field is utilized by the channel to acquire initial gain, frequency and phase lock to the readback data stream. The sync field and following data block are written together using a single continuous write operation. During readback the channel acquires timing lock to the sync field so that the synchronous detection of the data block following the sync field is guaranteed.

A timing loop problem results when a programmable digital filter is provided as part of the PRML channel. The tracking timing loop operates from the digital filter output, while the acquisition timing loop bypasses the digital filter and operates directly from samples from an analog to digital converter (ADC). In order to avoid undesirable phase shift when switching from acquisition timing mode to tracking timing mode, certain constraints are forced on the tap weights of the digital filter. A need exists for an acquisition timing loop method and apparatus that provides additional freedom for the selection of digital filter tap weights and that is simple to implement.

SUMMARY OF THE INVENTION

A principal object of the present invention is to provide improved acquisition timing loop method for PRML data detection in a disk drive data storage system. Other objects are to provide such acquisition timing loop method that provides additional freedom for the selection of digital filter tap weights substantially without negative effects, and that overcome many of the disadvantages of prior art arrangements.

In brief, the objects and advantages of the present invention are achieved by timing loop method and apparatus for data detection in a partial-response maximum-likelihood (PRML) data channel. The PRML data channel includes an analog to digital converter (ADC) providing samples to a digital filter during a tracking mode and to a gain and timing control during an acquisition mode. Sample values from the ADC are received at peaks and zeros on sync field pattern. An error absolute value is calculated from the received ADC sample values and an error sign of the calculated timing error is calculated using a most significant bit of the current and a previous sample. Timing correction values are calculated responsive to the calculated error absolute value and are applied to a clock gated register that latches and holds the generated timing correction values for a predefined number of clock cycles.

BRIEF DESCRIPTION OF THE DRAWING

The present invention together with the above and other objects and advantages may best be understood from the following detailed description of the embodiment of the invention illustrated in the drawings, wherein:

FIG. 1 is a schematic and block diagram of a data storage disk file embodying the present invention;

FIG. 2 is a diagram showing the accessing mechanism for a single disk surface of the apparatus of FIG. 1;

FIG. 3 is a diagram illustrating a PRML data channel for carrying out acquisition timing loop control according to the method of the present invention in the data storage disk file of FIG. 1;

FIG. 6 is a block diagram of an (n+0.5)T acquisition timing loop circuit of the invention;

DETAILED DESCRIPTION OF THE PREFERRED EMBODIMENT

Figure 4:
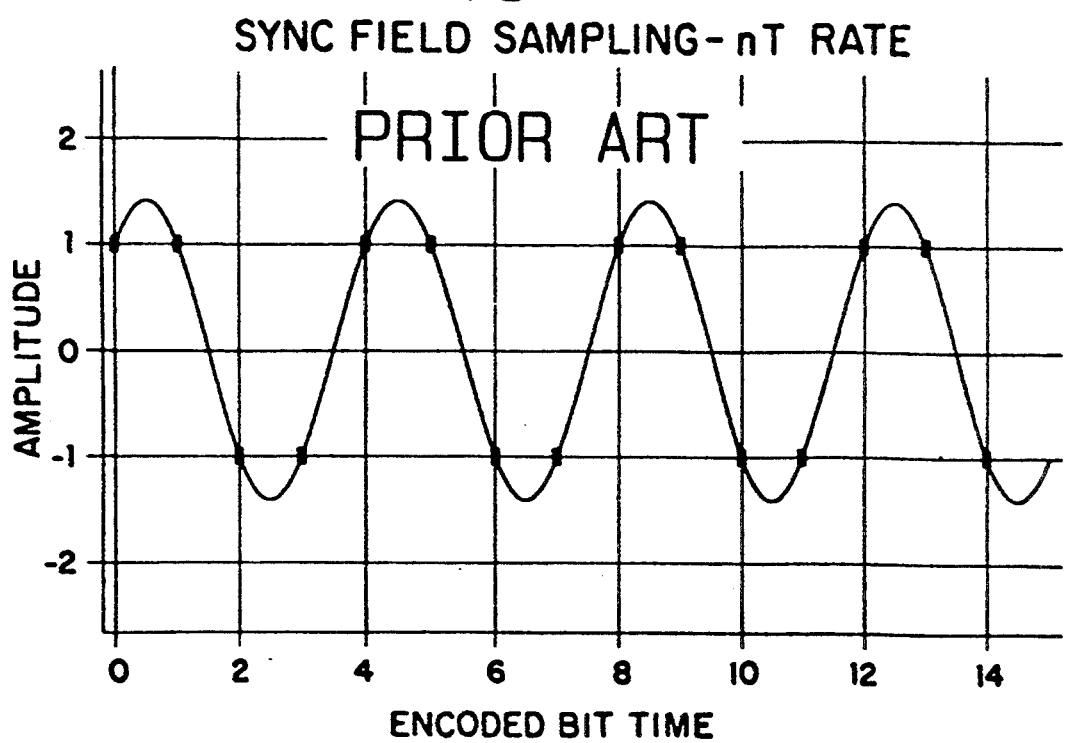
FIG. 4 is a graph illustrating proper sync field sampling using a standard nT timing algorithm in the data storage disk file of FIG. 1.

In FIG. 1 there is shown a partly schematic block diagram of parts of a data storage disk file 10 including a data storage medium generally designated as 12 and an interface control unit generally designated as 14. A rigid magnetic disk drive unit 12 is illustrated in simplified form sufficient for an understanding of the present invention because the utility of the present invention is not limited to the details of a particular drive unit construction.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 39 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied. During operation of the disk file 10, the various components of the disk file 10 are controlled in operation by signals generated by control unit 14 such as motor control signals on line 26A and position control signals on line 38A.

In accordance with the features of the present invention, an acquisition timing loop algorithm is provided with a $(n+0.5)T$ delay constraint to be used in the digital filter 58 to facilitate additional freedom for digital filter tap weights than for only a conventional or standard $nT$ delay constraint for a partial-response maximum-likelihood (PRML) recording channel 40 available in the disk file 10. The $nT$ refers to group delay through the digital filter 58 being a multiple of the sampling period $T$ at sync frequency. The $(n+0.5)T$ delay constraint provides an integral number of bit delay plus 0.5 bit delay. The $(n+0.5)T$ acquisition timing loop algorithm incorporates the same hysteresis effect as the standard $nT$ acquisition timing loop algorithm to prevent any possible indecision point in the loop which could result in a hang-up condition. The $(n+0.5)T$ acquisition timing loop algorithm incorporates the same orthogonality to the gain loop as the standard $nT$ acquisition timing loop algorithm to prevent false timing corrections. The $(n+0.5)T$ acquisition timing loop algorithm incorporates the same matched transfer gain as the standard $nT$ acquisition timing loop algorithm so that either algorithm can be selected without changing the closed loop gain. Because the $(n+0.5)T$ acquisition timing loop algorithm derives timing corrections from samples occurring at the zero in the sync field waveform where the slope of the signal is highest, the reliability of the corrections is enhanced due to the insensitivity of noise and other signal defects at that point. Further the $(n+0.5)T$ acquisition timing loop algorithm is simple to implement requiring only about 70% of the gates needed to implement the standard $nT$ acquisition timing loop algorithm.

Referring now to FIG. 3, there is shown a block diagram of the PRML data channel 40 for carrying out the $(n+0.5)T$ acquisition timing loop control method of the invention. The PRML recording channel uses class IV partial-response (PR) signals accomplished by a PR-IV filter function. Data to be written is applied to an encoder 42 for providing a modulation coded output having predefined run length constraints, such as for the minimum and maximum number of consecutive zeros and the maximum run length of zeros in the even and odd recorded sequences in the overall recorded sequence. A precoder 44 follows the encoder 42 described by a $1/(1-D^2)$ operation where D is a unit delay operator. A PRML precomp 46 coupled to the precoder 44 provides a modulated binary pulse signal applied to a write circuit 48 that provides the modulated write current for writing to the disk surface. An analog read signal is obtained at head and disk block 50 described by the $(1-D^2)$ operation. The read signal is applied to a variable gain amplifier (VGA) 52. The amplified read signal is applied to a lowpass filter 54. The filtered read signal is converted to digital form by an analog to digital converter (ADC) 56.

The samples of the ADC 56 are applied to a digital filter 58, such as a 10 tap finite impulse response (FIR) digital filter, and are applied to a gain and timing control 60. The gain and timing control 60 provides a gain control signal to the VGA 52 and provides a timing control signal to the ADC 56 via a voltage controlled oscillator 62. The filtered signal from the digital filter 58 is applied to a Viterbi decoder 64 coupled to a decoder 66 to complete the maximum-likelihood (ML) detection process for data read back.

In accordance with the invention, additional freedom for the selection of digital filter tap weights is provided in the PRML data detection by allowing the filter 58 to maintain an $(n+0.5)T$ delay constraint at sync field frequency. In a PRML class IV channel, repeated two-length magnets are used as the sync field pattern. The readback waveform of the sync field pattern is a single tone sinewave with a frequency of $fc/4$.

A conventional $nT$ delay constraint at sync field sampling is illustrated in FIG. 4. Samples on the sync field pattern are made to occur at +1 and −1 levels using the standard $nT$ acquisition timing loop algorithm. The PRML channel samples each period of the sinewave four times and these samples are used by the acquisition timing loop in the channel to generate timing corrections. The timing corrections at block 60 adjust the sampling frequency and phase such that the samples occur at precise locations on the sync field pattern. The acquisition timing loop operates on the sync field only and operates directly from the samples of the ADC 56 in order to minimize delay in the loop. After initial timing lock has been achieved using the sync field pattern, a separate tracking timing loop at block 60 to maintain timing lock over random customer data. The tracking timing loop operates from the samples of the digital filter 58.

Using the standard $nT$ acquisition timing loop algorithm eliminates two degrees of freedom in the digital filter tap weight selection as defined as follows.

First, the digital filter 58 is defined by the following relationship:

$$\sum_{k=1}^{10} TAP_k Z^{-k-1} = Z^{-n}$$

where n is an integer from 0 to 9, $TAP_k$ are tap weights and $Z = e^{jwT}$.

$$\text{Sync Frequency} = \frac{1}{4T}$$

$$wT = 2\pi \left(\frac{1}{4T}\right) T = \frac{\pi}{2}$$

The tap weights must obey the following constraints:

$$\sum_{k=1}^{10} TAP_k e^{j\frac{\pi}{2}(-k-1)} = e^{j\frac{\pi}{2}(-n)} \quad \text{(where } n \text{ is 0 to 9)}$$

Tap weights are defined as follows:

$-TAP_1 + TAP_3 - TAP_5 + TAP_7 - TAP_9 = 1$ $-TAP_2 + TAP_4 - TAP_6 + TAP_8 - TAP_{10} = 0$ or $$-TAP_1+TAP_3-TAP_5+TAP_7-TAP_9=0$$

$$-TAP_2+TAP_4-TAP_6+TAP_8-TAP_{10}=1$$

Figure 5:
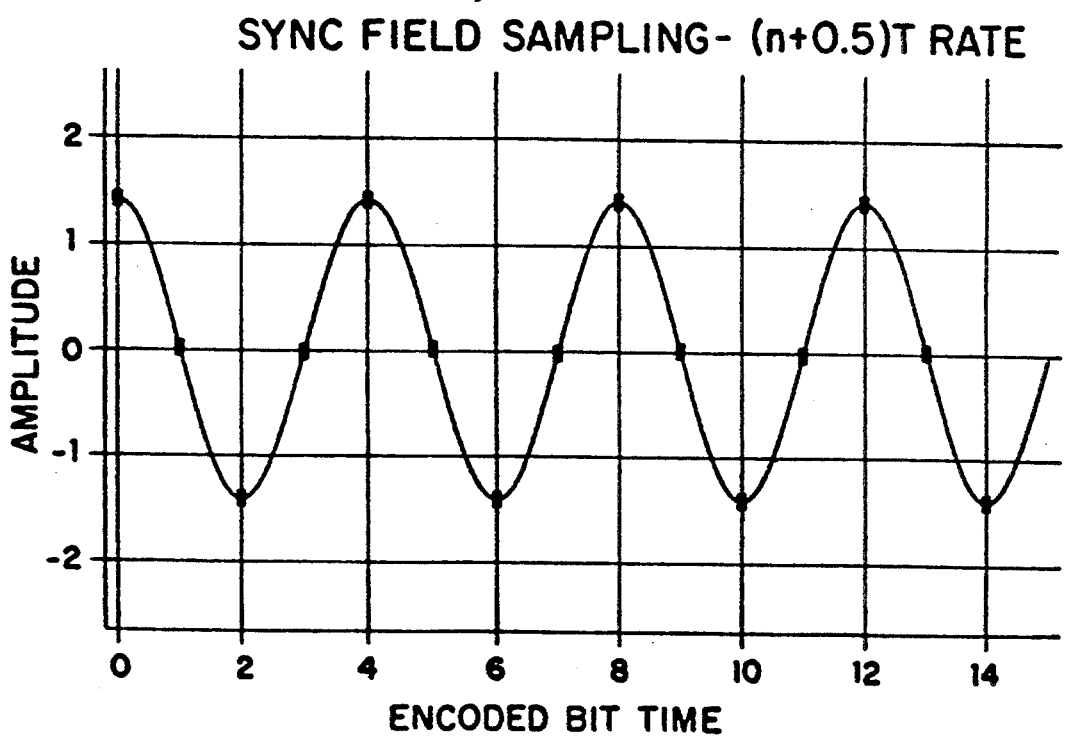
FIG. 5 is a graph illustrating proper sync field sampling using a (n+0.5)T timing algorithm according to the present invention in the data storage disk file of FIG. 1.
Figure 5A:
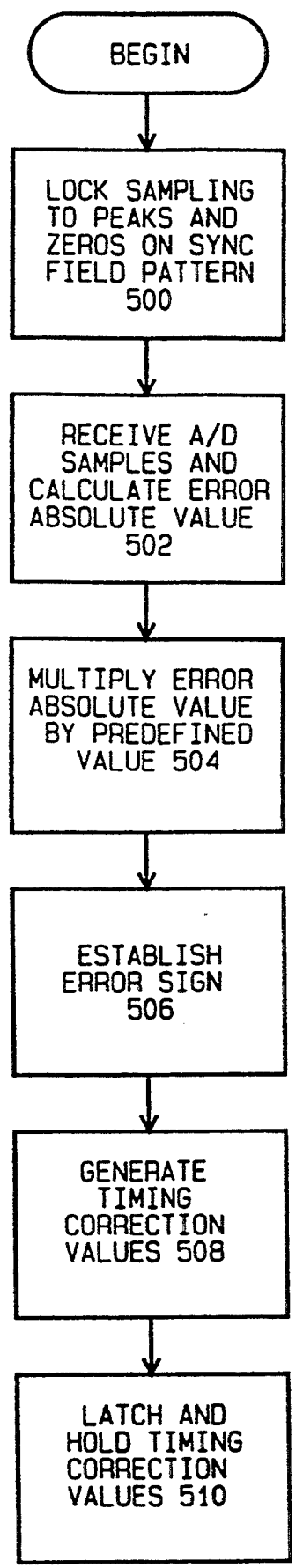
FIG. 5A is a flow chart illustrating the operation of (n+0.5)T timing loop algorithm of the present invention.

Referring to FIGS. 5 and 5A, (n+0.5)T sampling of the present invention is illustrated which provides additional freedom for the selection of digital filter tap weighs by allowing the filter to maintain an (n+0.5)T delay constraint at sync field. An (n+0.5)T acquisition timing loop locks sampling to the peaks and zeros on the sync field pattern (block 500). The additional allowed constraints for the digital filter tap weight selection are defined as follows:

$$\sum_{k=1}^{10} TAP_k Z^{-k-1} = Z^{-n-0.5} \text{ (where } n \text{ is an integer from 0 to 8)}$$

$$Z = e^{jwT}$$

Sync Frequency $= \frac{1}{4T}$ $$wT = 2\pi \left(\frac{1}{4T}\right)T = \frac{\pi}{2}$$

$$\sum_{k=1}^{10} TAP_k e^{j\frac{\pi}{2}(-k-1)} = e^{j\frac{\pi}{2}(-n-0.5)} \text{ (where } n \text{ is 0 to 8)}$$

Tap weights are defined as follows:

$$-TAP_1 + TAP_3 - TAP_5 + TAP_7 - TAP_9 = 1/\sqrt{2}$$

$$-TAP_2 + TAP_4 - TAP_6 + TAP_8 - TAP_{10} = 1/\sqrt{2}$$

or $$-TAP_1 + TAP_3 - TAP_5 + TAP_7 - TAP_9 = 1/\sqrt{2}$$

$$-TAP_2 + TAP_4 - TAP_6 + TAP_8 - TAP_{10} = -1/\sqrt{2}$$

Referring also to FIG. 6, there is shown a block diagram of an (n+0.5)T acquisition timing loop circuit 60A of the invention. An absolute value function 80 includes five XNOR gates 82, 84, 86, 88 and 90 used to calculate the absolute value of the timing error from the incoming A/D sample values Xn(0)–Xn(5) (block 502). A 0.75 multiplier 92 includes combinational logic gates including XOR 94, 96, 98, 100, XNOR 102, NAND 104, OR 106, 108 and AND(A)/OR(O) blocks 110, 112, 114, arranged as shown, used to attenuate the magnitude of the timing error to 75% at the output lines labelled Y0, Y1, Y2, Y3 (block 504). The 0.75 multiplier 92 is used to match the transfer gain of the (n+0.5)T loop to the standard nT loop. The truth table for the 0.75 multiplier 92 is set forth below in Table I. An error sign XOR gate 120 generates the proper sign of the timing error using the MSB of the previous sample Xn-1(0) effectively multiplied by the sign of the current sample error to generate the sign of the timing error (block 506). An interleave selector 122 including an XNOR 124, a latch 126 and a feedback OR 128 is used to determine which of the two sample interleaves will be selected to converge to zero samples. The samples Xn(0) or Xn-2(0) of the selected interleave are used to generate the timing corrections and the samples of the non-selected inter-leave used for slope prediction (block 508). Latch 126 represents the hysteresis memory of the algorithm. XNOR gate 124 is used to indicate a slope indecision condition so that the current sample interleave is forced to be the selected interleave when this condition is sensed so that reliable slope estimation is guaranteed. A register 130 clock-gated via an AND gate 132 latches and holds the final timing correction in a sign-magnitude format as indicated at sign outputs labelled DAC INC or via an inverter gate 134 DAC DEC; and magnitude outputs labelled DAC MAG0, DAC MAG1, DAC MAG2, DAC MAG3 (block 510). Register 130 typically holds each timing correction for two clock cycles with the second cycle hold accomplished via the clock gating from the interleave selector 122.

TABLE I

| INPUT XXXXX 01234 | OUT YYYY 0123 |
|---|---|
| 00000 | 0000 |
| 00001 | 0001 |
| 00010 | 0001 |
| 00011 | 0010 |
| 00100 | 0011 |
| 00101 | 0100 |
| 00111 | 0101 |
| 01000 | 0110 |
| 01001 | 0111 |
| 01010 | 0111 |
| 01011 | 1000 |
| 01100 | 1001 |
| 01101 | 1010 |
| 01110 | 1010 |
| 01111 | 1011 |
| 10000 | 1100 |
| 10001 | 1101 |
| 10010 | 1101 |
| 10011 | 1110 |
| 10100 | 1111 |
| 10101 | 1111 |
| 10110 | 1111 |
| 10111 | 1111 |
| 11000 | 1111 |
| 11001 | 1111 |
| 11010 | 1111 |
| 11011 | 1111 |
| 11100 | 1111 |
| 11101 | 1111 |
| 11110 | 1111 |
| 11111 | 1111 |

Figure 7:
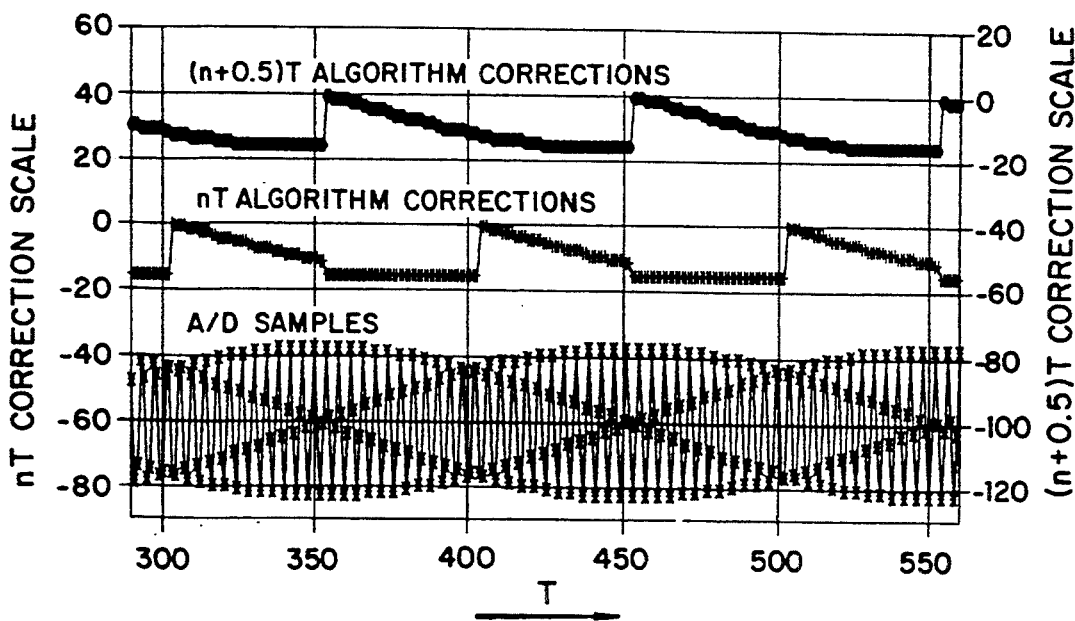
FIGS. 7 and 8 are graphs to illustrate the operation of (n+0.5)T timing loop algorithm of the present invention together with the operation of the standard nT timing loop algorithm.
Figure 8:
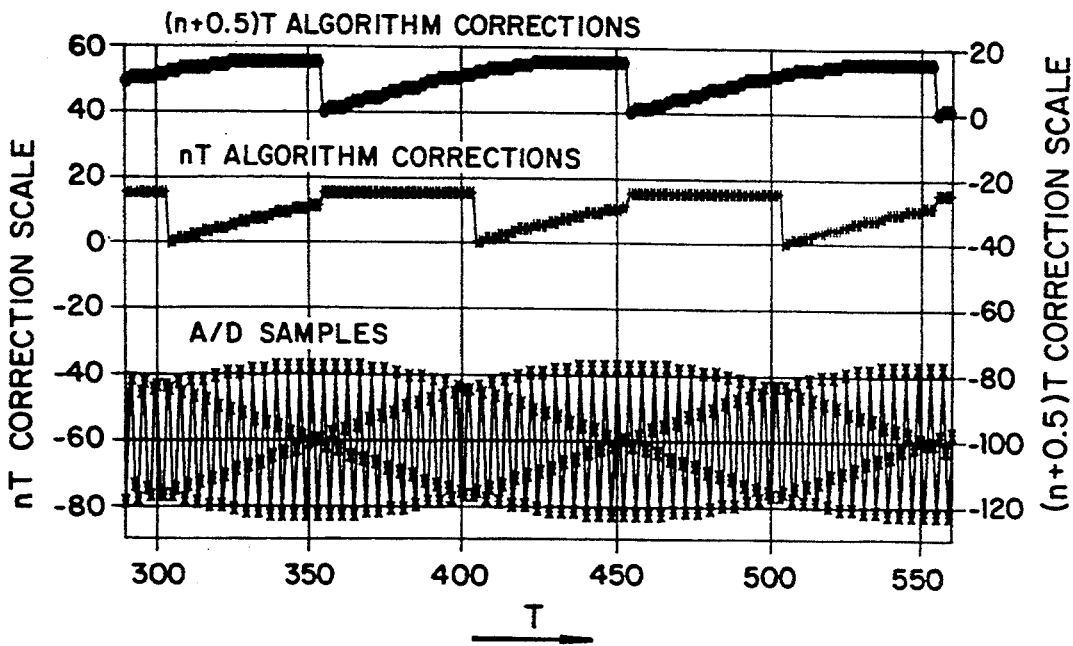

FIGS. 7 and 8 provide open loop illustrations for varying timing corrections for the (n+0.5)T acquisition timing loop circuit 60A and the standard nT acquisition timing loop circuit with the scale for nT correction scale shown relative the right vertical axis and the scale for (n+0.5)T-correction scale shown relative the left vertical axis. Time values T are shown relative to the horizontal axis. In FIG. 7, open loop partial-response digital filter (PRDF) simulations are shown for 1% fast sampling and in FIG. 8, open loop PRDF simulations are shown for 1% slow sampling. All positive attributes of the standard acquisition timing loop algorithm nT are maintained by the acquisition timing loop algorithm (n+0.5)T of the invention. In FIGS. 7 and 8, the two loop algorithms are demonstrated to be very similar except for the 0.5 bit phase shift of the respective output timing errors. In FIG. 7, both the nT and (n+0.5)T algorithm corrections are negative having matching time-shifted slopes while in FIG. 8 both the nT and (n+0.5)T algorithm corrections are positive having matching time-shifted slopes. Considering both FIGS. 7 and 8, it can be understood that the (n+0.5)T algorithm provides proper timing corrections preserving the goodness of the standard acquisition timing loop algorithm nT.

In summary, the (n+0.5)T acquisition timing loop circuit 60A is a fast and simple circuit that allows additional freedom in the selection of tap weights for the digital filter 58 and enhances overall performance of channel 40. The (n+0.5)T acquisition timing loop circuit 60A has only a one clock cycle transfer delay which optimizes acquisition performance in the PRDF channel 40.

What is claimed and desired to be secured by Letters Patent of the United States is:

1. A method of acquisition timing control for data detection in a partial-response maximum-likelihood (PRML) data channel including an analog to digital converter (ADC) providing sample values to a digital filter during a tracking mode and to a gain and timing control during an acquisition mode, said acquisition timing control method comprising the steps of:
   receiving sample values from the ADC corresponding to peaks and zeros on sync field pattern and calculating an error absolute value from said received ADC sample values;
   establishing an error sign of said calculated error absolute value using a most significant bit of both said received ADC sample value and a previous sample;
   generating timing correction values responsive to said calculated error absolute value; and
   latching and holding said generated timing correction values and said established error sign of said calculated error absolute value for a predefined number of clock cycles.

2. The method as recited in claim 1 further comprising the step of:
   selecting one of two sample interleaves for receiving incoming sample values and wherein said step of latching and holding said generated correction values is responsive to said selected one of two sample interleaves.

3. The method as recited in claim 1 wherein the step of generating timing correction values further includes the step of:
   multiplying said calculated error absolute value by a predetermined value.

4. The method as recited in claim 3 wherein the predetermined value is equal to 0.75.

5. The method as recited in claim 1 wherein said step of calculating said error absolute value from said received ADC sample values provides the difference between the ADC sample values and a predefined ADC ideal zero.

6. The method as recited in claim 1 wherein said predefined number of clock cycles is two.

7. The method as recited in claim 1 wherein said step of establishing said error sign of said calculated error absolute value includes the step of providing an XOR gate having an input to receive said most significant bit of said previous sample and an input to receive a most significant bit of a current sample.

8. Apparatus for acquisition timing control for data detection in a partial-response maximum-likelihood (PRML) data channel including an analog to digital converter (ADC) providing sample values to a digital filter during a tracking mode and to a gain and timing control during an acquisition mode, said acquisition timing control apparatus comprising:
   means for receiving sample values from the ADC corresponding to peaks and zeros on sync field pattern and for calculating an error absolute value from said received ADC sample values;
   means for establishing an error sign of said calculated error absolute value;
   means for generating timing correction values responsive to said calculated error absolute value; and
   means for latching and holding said generated timing correction values and said established error sign of said calculated error absolute value for a predefined number of clock cycles.

9. The apparatus as recited in claim 8 further comprising:
   means for selecting one of two sample interleaves for receiving incoming sample values and wherein said means for latching and holding said generated correction values is responsive to said means for selecting one of two sample interleaves.

10. The apparatus as recited in claim 8 further comprising:
    means for multiplying said calculated error absolute value by a predetermined factor.

11. The apparatus as recited in claim 10 wherein said predetermined factor equals 0.75.

12. The apparatus as recited in claim 8 wherein said received ADC sample values includes $X_n^0$, $X_n^1$, $X_n^2$, $X_n^3$, $X_n^4$ and $X_n^5$, and wherein said means for calculating said error absolute value include a plurality of five XNOR gates each having a first input connected to receive $X_n^0$ and a second input connected to receive a respective one of $X_n^1$, $X_n^2$, $X_n^3$, $X_n^4$ and $X_n^5$.

13. The apparatus as recited in claim 8 wherein said means for establishing said error sign of said calculated error absolute value includes an XOR gate having inputs connected to receive a most significant bit of current and previous of said ADC sample values.

14. A direct access storage device of the type including a partial-response maximum-likelihood (PRML) data channel comprising:
    a housing;
    at least one disk mounted in said housing for rotation about an axis and having at least one disk surface for storing data;
    transducer means mounted for movement across said disk surface for reading and writing data to said disk surface;
    an analog to digital converter (ADC) coupled to said transducer means for converting an analog input signal to digital sample values applied to a digital filter during a tracking mode and to a gain and timing control during an acquisition mode, an acquisition timing control including:
    means for receiving sample values from the ADC corresponding to peaks and zeros on sync field pattern and for calculating an error absolute value from said received ADC sample values;
    means for establishing an error sign of said calculated error absolute value;
    means for generating timing correction values responsive to said calculated error absolute value; and
    means for latching and holding said generated timing correction values and said established error sign of said calculated error absolute value for a predefined number of clock cycles.

15. The direct access storage device as recited in claim 14 further comprising:
    multiplier means for multiplying said calculated error absolute value by a selected factor.

* * * * *